United States Patent [19]
Little et al.

[11] Patent Number: 6,018,770
[45] Date of Patent: Jan. 25, 2000

[54] SYSTEM AND METHOD FOR MANAGING PACKET-SWITCHED CONNECTIONS

[75] Inventors: Herb A. Little, Waterloo; Mark E. Church; Louise A. MacCallum, both of Kitchener; Gary P. Mousseau, Waterloo, all of Canada

[73] Assignee: Research In Motion Limited, Waterloo, Canada

[21] Appl. No.: 08/949,297

[22] Filed: Oct. 13, 1997

[51] Int. Cl.[7] .................................................. G06F 13/00
[52] U.S. Cl. ......................................... 709/223; 395/500
[58] Field of Search ................................. 455/557, 13.2, 455/12.1; 395/500, 200, 182.02, 650; 709/141, 120, 200, 240, 238, 223, 224; 370/85.13, 389, 455, 401; 379/242

[56] References Cited

U.S. PATENT DOCUMENTS

| | | | |
|---|---|---|---|
| 5,371,852 | 12/1994 | Attanasio et al. | 709/200 |
| 5,444,763 | 8/1995 | Lazaridis et al. . | |
| 5,500,890 | 3/1996 | Rogge et al. . | |
| 5,559,800 | 9/1996 | Mousseau et al. | 370/85.13 |
| 5,596,574 | 1/1997 | Perlman et al. | 370/389 |
| 5,634,010 | 5/1997 | Ciscon et al. | 709/238 |
| 5,706,440 | 1/1998 | Compliment et al. | 709/224 |
| 5,751,715 | 5/1998 | Chan et al. | 370/455 |
| 5,764,756 | 6/1998 | Onweller | 379/242 |
| 5,764,955 | 6/1998 | Doolan | 395/500 |
| 5,787,363 | 7/1998 | Scott et al. | 455/557 |
| 5,790,939 | 8/1998 | Malcom et al. | 455/13.2 |
| 5,799,016 | 8/1998 | Onweller | 370/401 |
| 5,802,445 | 9/1998 | Wiedeman et al. | 455/12.1 |
| 5,812,779 | 9/1998 | Ciscon et al. | 709/223 |
| 5,907,610 | 5/1999 | Onweller | 379/242 |
| 5,948,069 | 9/1999 | Kitai et al. | 709/240 |
| 5,960,176 | 9/1999 | Kuroki et al. | 709/223 |

*Primary Examiner*—Frank J. Asta
*Assistant Examiner*—Thong Vu
*Attorney, Agent, or Firm*—Jones, Day, Reavis & Pogue; Charles B. Meyer, Esq.

[57] ABSTRACT

A system and method for managing connections between one or more local terminals and one or more remote systems over a packet-switched network is disclosed. The invention includes a gateway computer that forms a bridge between the local terminals and the one or more host systems, the gateway and the local terminals including computer software instructions for embedding and filtering special connection identification information in each transaction request. The local terminals embed connection identification information into each request packet requesting a connection to a remote host system, and the gateway filters this information and verifies that the gateway and local terminal(s) are synchronized. The gateway then manages the communication to the host system using the native protocol of the host, thereby minimizing communication over the packet-switched network. By synchronizing the connection attempts of the local terminals to the gateway, problems associated with connecting multiple transaction-generating terminals to one or more host systems via a packet-switched network are minimized.

23 Claims, 4 Drawing Sheets

SYSTEM AND METHOD FOR MANAGING PACKET-SWITCHED CONNECTIONS

BACKGROUND OF THE INVENTION

The present invention is directed toward the field of connecting one or more local terminals to remote host systems over a packet-switched network, and then managing the established connections. In particular, a system and method for managing packet-switched connections between one or more point-of-sale terminals and remote transaction processing host systems (such as credit-card authorization systems) through a gateway is disclosed. The system and method are particularly useful in a wireless packet-switched environment, but can be extended to any type of packet-switched network. The gateway forms a bridge between the point-of-sale terminals, which are connected to the gateway via a packet-switched network, such as a wireless network, and at least one transaction processing host connected to the gateway via a land-line network, such as an X.25 synchronous data network. Although the present invention is describe in terms of point-of-sale transaction processing, its teaching is not limited to this one application and can be used in any type of transaction processing environment where multiple connections are established, such as data base inquiry, message sending and acknowledgment, on-line transaction processing and order placement, intelligent forms/agents, dispatch systems, or wireless telemetry, to name a few.

Recently, customers at point-of-sale locations have been making purchases by means other than cash, like a credit card. The credit card information is input into a local terminal by swiping the credit card through a credit card reader or by entering the credit card data manually into a local terminal. Before the purchase can be completed, the transaction must be validated by performing a credit check on the card and the amount of the purchase. Generally this requires communication between the local terminal at the point-of-sale location and a remote host system that authorizes the transaction, the remote host system storing information regarding the validity and credit limits of various consumer credit cards.

Prior to the availability of wireless packet-switched networks, such as the Mobitex Radio Network ("Mobitex"), which is operated by RAM Mobile Data, or DataTAC, which is operated by Ardis, credit card authorizations were performed almost exclusively via the Public Switched Telephone Network ("PSTN"). In this type of prior art transaction processing system each point-of-sale terminal was connected to a PSTN telephone line, and created a circuit-switched connection to the host transaction processing system. Also common was the use of a PSTN PAD (Packet Assembler Disassembler) for multiplexing all the connections through an X.25 network to a host. Once connected, the point-of-sale terminal communicated directly to the host system in order to obtain authorization for the particular transaction.

With the coming of wireless packet-switched networks, such as those mentioned above, several advantages were available for connecting point-of-sale terminals to remote host systems. For example, the point-of-sale terminals no longer had to be directly connected to a single telephone connection, so multiple terminals at the point-of-sale location could share a single wireless connection, which was more efficient, less costly, and provided faster response times than the land-line PSTN terminals. This method of sharing the wireless connection was accomplished by "packetizing" the data from each wireless terminal and embedding certain network header information into each packet to identify the sending and receiving systems and facilitate routing of the packets through the wireless network. Such wireless terminals could communicate over a land-line phone connection or a wireless packet-switched network. An example of such a wireless point-of-sale terminal capable of dual-mode communication is disclosed in U.S. Pat. No. 5,444,763, assigned to the assignee of the present invention. The teaching provided by this patent is hereby incorporated by reference.

Prior attempts to connect point-of-sale terminals to remote transaction processing hosts via a wireless packet-switched network included an intermediate gateway computer. The gateway had at least two communication ports, one connected to the wireless network, and a second port connected to a land-line network compatible with the remote transaction host. An example of such a gateway system is disclosed in U.S. Pat. No. 5,559,800, which is assigned to the assignee of the present invention. The disclosure of this patent is hereby incorporated by reference. Using the prior method, the point-of-sale terminal transmitted a packet of information over the wireless network to the gateway to initiate a connection to a remote host. The gateway automatically created a direct connection to the host transaction processing computer and then forwarded the information in the packet to the host system. The direct connection was terminated when the host system responded to the request packet. In this type of system, the gateway's functionality was limited to receiving, transforming and communicating messages between the point-of-sale terminals and the host transaction processing system.

One disadvantage of this prior method of wireless transaction processing was that the host system required special modification to support the packetized communication from the gateway computer. The host systems used a legacy protocol that was not compatible with the more recent packet-switched scheme employed by the wireless networks. Legacy protocols were unfriendly to wireless networks because of short time exchange requirements and "chatty" inefficient conversations. Another disadvantage of this early method was that there was no way to distinguish one transaction packet from another. This lack of transaction identification could cause communication problems with the host system when, for example, a packet was lost in the wireless network or a request sequence was aborted, leading to a point-of-sale terminal receiving an authorization response from a previously aborted request—referred to herein as "rogue" packet responses. Yet another disadvantage of this prior method was that the gateway and its associated communication protocol software had to be customized for every host processing system.

Another prior method of wireless transaction processing provided a fully simulated, i.e. virtual, circuit-switched connection over the wireless packet network between the local point-of-sale terminal(s) and the remote transaction processing host. This method provided some advantages over the actual circuit-switched connection noted above, but was disadvantageous because it required numerous packets to be sent over the wireless network in order to establish and tear down the virtual connection. This decreased the efficiency and speed of the transaction connection and increased costs for wireless networks that charge on a per-packet-sent basis.

Therefore, there remains a need in this art for a system and method for efficient and reliable management of connections over a packet data network, such as a wireless packet network. More particularly, there remains a need for such a system and method that manages connections between one or more point-of-sale terminals and remote transaction processing hosts through a gateway computer.

There remains a further need for such a system and method that overcomes the disadvantages of the prior connection systems by providing a means for identifying particular transaction requests generated by each point-of-sale terminal, and a means for synchronizing the point-of-sale terminals and the gateway computer so that the gateway can determine whether a particular transaction has been aborted, or a packet has been lost during transmission, thereby avoiding the problem of authorizing aborted requests.

There remains an additional need for such a system and method that minimizes communication over the packet-switched network by providing enhanced processing capability at the gateway computer that allows the gateway to manage communication with the remote host processing system.

SUMMARY OF THE INVENTION

The present invention overcomes the problems noted above and satisfies the needs in this field for a reliable and efficient system and method for managing connections over a packet-switched network between point-of-sale terminals and remote transaction processing hosts via a gateway computer. The preferred packet-switched network is a wireless network, although the invention is applicable to any type of packet-switched data network. The invention includes a connection management protocol implemented between the point-of-sale terminals and the gateway. According to this connection management protocol, special connection identification ("Connection-ID") information and commands are embedded into the packets transmitted over the wireless network between the point-of-sale terminals and the gateway. This information provides a means for the gateway to keep track of which point-of-sale terminal has made a transaction request and to determine whether a response from a particular remote processing host should be passed through to the point-of-sale terminal. The present invention also enables the gateway to synchronize itself to each point-of-sale terminal so that the gateway knows when a particular transaction request has been aborted, or when an error has occurred during transmission over the wireless network.

The system of the present invention includes at least one point-of-sale terminal connected to a gateway computer via a packet-switched network, such as a wireless network, and at least one host transaction processing computer connected to the gateway via a land-line or other network connection. The gateway and the point-of-sale terminal include software programming that enables each to implement the connection management protocol. The gateway also includes a configuration file that enables the gateway to determine what host computer to connect a particular requesting point-of-sale terminal to, and also includes a Connection-ID file that maintains a gateway Connection-ID value for each point-of-sale terminal. The Connection-ID file, in connection with the connection management software, provide the means for the gateway to determine if it has become unsynchronized from a particular point-of-sale terminal, thereby indicating that an error has occurred and that the transaction request should not be authorized.

According to the method of the present invention, transactions between local point-of-sale computers and remote host systems are managed at a gateway computer by: (i) embedding special Connection-ID information into each transaction request packet at the local point-of-sale computers; (ii) transmitting the transaction request packet over the wireless network to the gateway; (iii) filtering the transaction request packet at the gateway to determine which remote host system to connect to for the particular transaction, and to determine if the gateway is synchronized with the requesting terminal; and (iv) if the gateway and point-of-sale terminal are synchronized, formatting the data packet into the legacy protocol of the remote processing host and communicating the transaction request information to the remote system for authorization. The method also includes: (v) receiving transaction response data from the host system at the gateway; (vi) embedding the special Connection-ID protocol information into data packets including the host response information; and (vii) transmitting the host response packets including the Connection-ID information to the requesting point-of-sale terminal.

As will be appreciated, the invention is capable of other and different embodiments, and its several details are capable of modifications in various respect, all without departing from the spirit of the invention. Accordingly, the drawings and description of the preferred embodiment are to be regarded as illustrative in nature and not restrictive.

BRIEF DESCRIPTION OF THE DRAWINGS

The present invention satisfies the needs noted above and solves the problems mentioned with the prior art systems and methods as will become apparent from the following description when read in conjunction with the accompanying drawings wherein.

DETAILED DESCRIPTION OF THE PREFERRED EMBODIMENT

Figure 1:
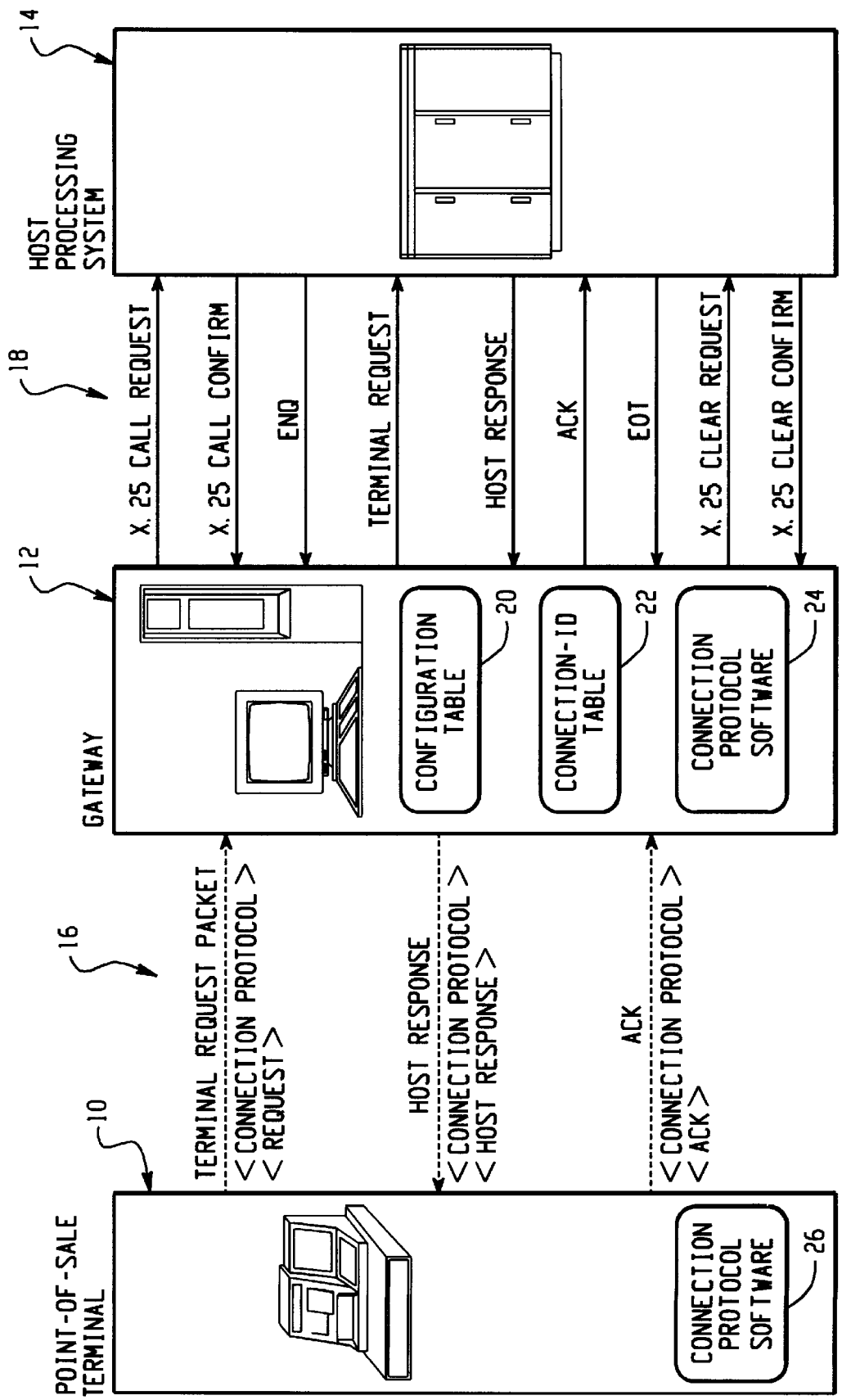
FIG. 1 is block diagram showing a typical connection session between a point-of-sale terminal and a remote host processing system via a gateway computer, using the method of the present invention.

Referring now to the drawings, FIG. 1 sets forth a block diagram of a system according to the present invention. Also shown in FIG. 1 is a typical connection management session according to the method of the present invention. Both the system and method will be described below.

The system of the present invention preferably includes at least one local point-of-sale terminal 10 connected to a gateway computer 12 via a packet-switched network 16, which is preferably a wireless network, and at least one host transaction processing system 14 connected to the gateway via land-line network 18. The local point-of-sale terminal 10 could be, for example, an electronic cash register having a wireless radio modem (not shown) for communication via the wireless network 16, or could alternatively be any other type of point-of-sale transaction processing machine, such as a personal computer, laptop computer, or stand-alone vending terminal. The point-of-sale terminal 10 includes special communications software, called the connection protocol software 26 that enables the point-of-sale terminal to participate in the method of the present invention, as described more fully below, and as described in connection with FIGS. 2, 3a and 3b.

The wireless network 16 is preferably a packet-switched digital radio-frequency network, such as the Mobitex or DataTAC radio networks. Alternatively, wireless network 16 could be any other type of telecommunications network that transmits data in discrete packets, including satellite packet switched data networks and land-line networks.

Gateway computer 12 is preferably a RIMGate® gateway computer, manufactured by the assignee of the present invention, and described more fully in commonly assigned U.S. Pat. No. 5,559,800, the teaching of which has been incorporated herein by reference. The gateway 12 forms a communications bridge between the wireless data network 16 and the land-line network 18. It includes software instructions (not shown) that enable the gateway to communicate using the language (i.e., protocol) of both the wireless network 16 and any land-line or other communications networks 18 that the gateway may be connected to. Gateway 12 also includes additional software, called the connection protocol software 24, which enables the gateway to participate in the method of the present invention, as described more fully below.

In connection with the gateway connection protocol software 24, the gateway 12 includes two data tables stored in memory, a configuration table 20, and a Connection-ID table 22. The configuration table 20 is a look-up table that the gateway 12 uses in order to determine what host system 14 a particular point-of-sale terminal 10 is trying to communicate with. The Connection-ID table 22 is another look-up table that is used by the gateway to synchronize to a particular point-of-sale terminal 10. This table stores the next expected Connection-ID—also referred to herein as the "gateway Connection-ID"—for each point-of-sale terminal. The operation of the system and utilization of these tables with the connection protocol software (24, 26) will be described more fully below in connection with the description of the method of the present invention and in connection with the description of FIGS. 2, 3*a* and 3*b*.

Still referring to FIG. 1, also shown is a typical connection management session according to the present invention. A transaction connection is begun when a credit card is swiped through a credit card reader, or the data is input by hand, at the point-of-sale terminal 10. The point-of-sale terminal is programmed to embed specific terminal Connection-ID protocol information into each packet of data it transmits over the wireless network 16. The means for carrying out this embedding step is the connection protocol software 26. On the other end of the wireless network 16 is the gateway 12, which also has been programmed to comprehend and extract the embedded terminal Connection-ID protocol information and to compare the terminal Connection-ID to the expected Connection-ID stored at the gateway in the Connection-ID table 22. The means for recognizing and extracting this information at the gateway 12 is the connection protocol software 24, which is also stored at the gateway. Using this special Connection-ID protocol, the gateway can manage a plurality of transactions with numerous point-of-sale terminals, all of which have been programmed to communicate using the special communication protocol.

The gateway computer 12 maintains a file, the Connection-ID table 22, containing the next Connection-ID expected for each point-of-sale terminal 10—i.e., the gateway Connection-IDs. The initial default value of the Connection-ID for each point-of-sale terminal 10 is the most negative four-byte number (Hex 80000000 stored in the packet as LSB to MSB). The gateway 12 will only accept a terminal Connection-ID from a given point-of-sale terminal 10 if it is greater than or equal to the gateway Connection-ID for the particular terminal, or less than or equal to one. If the gateway determines that the terminal Connection-ID does not meet this criteria, then the system has become unsynchronized, and the gateway 12 does not make the connection to the requested host system 14. If the incoming terminal Connection-ID is as expected, i.e., the system is synchronized, then the gateway 12 will reformat and transmit the requested data packet to the proper host system 14. If the terminal Connection-ID in the received packet is identical to that for the current connection, the packet will be sent to the host system 14 without breaking the current connection. If a new terminal Connection-ID is received that meets the synchronization criteria and another connection with the same point-of-sale terminal is active, then the current connection will be closed, and a new connection to the host system 14 will be initiated. This functionality is carried out by the gateway 12 operating under the connection protocol software instructions 24.

The gateway 12 uses a configuration table 20 to determine where to send (i.e., what host) a particular packet of data transmitted by a local terminal. The host is determined based on the destination routing information generally present in a packet-switched network. In the Mobitex network this routing information is known as the Mobitex Access Number or MAN. In a DataTAC network a Logical Link Identifier (LLI) would be used as the routing information. The gateway 12 extracts the MAN number from the incoming packet and uses the configuration table to look up the correct host with the MAN number serving as an index into the table.

The example transaction session set forth in FIG. 1 connects a point-of-sale terminal 10 and a host system 14 via a gateway computer 12. In this example, the point-of-sale terminal 10 is connected to the gateway 12 by a wireless packet-switched network 16, and the gateway 12 is in turn connected to the host system 14 via a land-line network 18, such as an X.25 synchronous data network.

Certain data communications characters are included in this figure, such as "ENQ", "ACK", and "EOT." Also used (but not shown) is the STX or "start of text" character. These special characters are well-known in point-of-sale communication systems that employ "send and wait" protocols, where a message is sent and then the terminal waits for a response from the host. "ENQ" or "inquiry," indicates polling and is sent by a destination system to request a response from a requesting terminal. The "ACK" or "acknowledge" character, indicates a proper receipt of a transmission from a sender. "EOT" or "end-of-transmission," indicates the termination of a transaction. Although FIG. 1 sets forth such a "send and wait" protocol exchange, it is to be understood that the invention is not limited to this type of protocol but can be extended to other types of communication exchanges.

A transaction request begins when the point-of-sale terminal 10 transmits a terminal request packet to the gateway 12, including the special Connection-ID protocol information. When the terminal request packet is received from the point-of-sale terminal 10 (and assuming that no connection is presently active), the gateway 12 filters the incoming packets and extracts the network header information (including the MAN number) and the special Connection-ID protocol header information, including the terminal Connection-ID. The gateway 12 then verifies that it is synchronized to the requesting point-of-sale terminal by comparing the received terminal Connection-ID with the expected value from the Connection-ID table 22 (the gateway Connection-ID) for the particular point-of-sale terminal 10 making the connection request. Assuming synchronization, the gateway 12 then sends an X.25 Call Request to the host processing system 14 associated with the destination MAN number extracted from the request packet. The network address of the host is stored in the gateway 12 at the configuration table 20, the destination MAN number serving as an index to look-up the hardware address of the host. The gateway 12 then waits for an X.25 Call Confirm, followed by an ENQ character, from the host processing system 14, before sending the terminal request packet to the host system 14. The X.25 Call Confirm and ENQ packets from the host system are not transmitted to the point-of-sale terminal 10, thus minimizing traffic on the wireless link 16.

The host system 14 responds to the terminal request packet by transmitting a host response packet to the gateway 12. The gateway sends the response packet (adding the Connection-ID protocol information) to the point-of-sale terminal 10 that requested the connection to the responding host system. The response packet includes the credit verification or authorization information. An acknowledging request packet that contains the ACK character is then transmitted from the point-of-sale terminal 10 to the gateway 12. If the terminal Connection-ID in the acknowledging request packet is for the currently connected host, then the gateway 12 will send the ACK to the host 14. If the host connection is no longer active, the gateway 12 will simply discard the ACK message.

Finally, the host system 14 transmits an EOT (End-Of-Transmission) character to the gateway 12 indicating the end of the transaction. The gateway 12 sends an X.25 Close Request to the host and then waits for an X.25 Close Confirm, formally closing the connection. The EOT message is not transmitted to the point-of-sale terminal 10.

As seen in FIG. 1, the method of the present invention minimizes communication over the wireless link 16 by programming the gateway 12 to carry out most of the administrative functions of managing the connection to the host system 14. The present invention also ensures reliable communication with the point-of-sale terminal(s) 10 by embedding the Connection-ID protocol information on either end of the wireless link 16.

The Connection-ID protocol consists of a message header that is added to data packets transmitted between each point-of-sale terminal 10 and the gateway 12. In front of this Connection-ID message header is the normal network routing header (including the MAN numbers) that is added to each packet in order to ensure correct routing of the data. Both of these headers are extracted from the data packets transmitted to the gateway 12, and the gateway then reformats the information contained in the packets for transmission to a particular host transaction processing computer 14 based on the legacy protocol of the host connection 18.

The connection protocol software 24 stored and operating at the gateway 12 enables the gateway to determine whether a particular point-of-sale terminal 10 is using the special Connection-ID protocol. The gateway 12 does this by looking for the STX character at the beginning of a data packet. If an STX character is present, then the gateway 12 assumes that the Connection-ID protocol is not being used. If there is no initial STX character, then the gateway assumes that the Connection-ID protocol is being used and proceeds to extract and process the protocol information, as described below.

If the gateway 12 determines that the terminal 10 is using the protocol, then it performs the extracting step noted above, and then proceeds to the synchronization and connection steps, discussed below. If the gateway 12 determines that the terminal 10 is not using the Connection-ID protocol, then there is no synchronization or extracting step, and the packet of information is simply re-formatted and transmitted to the requested host data processing system 18. In this manner, the present invention can simultaneously support point-of-sale terminals that include and that do not include the special Connection-ID protocol.

The Connection-ID protocol information embedded by the point-of-sale terminal 10 when making a transaction connection request has the following structure:

DATA PACKET=<Connection-ID Protocol Information><Data>

Also included (but not shown) before the Connection-ID protocol information is the normal wireless network routing information, which for the Mobitex network is the MAN number of the terminal 10 and the host system 14. The Connection-ID protocol information is embedded into the transmitted data packets by the point-of-sale terminal 10 according to the connection protocol software 26 programmed into the terminal. The data packet with the embedded Connection-ID protocol information is further structured as follows:

<Connection-ID Protocol Information>=<Protocol ID><Protocol Data><Protocol ID)>=A unique number corresponding to a gateway command <Protocol Data>=Data used by the Connection Protocol Software <Data>=Transaction Request or Response in Host System Format The protocol ID is a unique number corresponding to a particular command to the gateway 12. The following commands and their formats are included in the Connection-ID protocol:

1) BAD_PROTO_ID (Hex 21):

This protocol ID is only sent by the gateway 12 to a point-of-sale terminal 10 and indicates that the requested protocol is not supported. For example, if the point-of-sale terminal 10 transmits a protocol ID to the gateway that is not part of the Connection-ID protocol supported by the connection protocol software 24 operating at the gateway, then a single packet containing this protocol ID will be returned to the point-of-sale terminal 10.

2) CONNECTION_PROTO_ID (Hex 22):

This protocol ID has the following format:

<Protocol Data>=<Connection ID><Connection I )>=signed long 4-byte integer (Synchronization Value)

This protocol ID is transmitted back and forth between the point-of-sale terminal 10 and the gateway 12, and includes the Connection-ID value for the transaction, which is preferably a four-byte number that the invention utilizes as a means of synchronizing the gateway 12 to each of the point-of-sale terminals 10. The Connection-ID value is a number that is generated by each point-of-sale terminal 10 for each transaction requested.

Before a particular point-of-sale terminal 10 first connects to the gateway 12 to request a transaction connection to a particular host processing system 14, the connection protocol software 26 at the point-of-sale terminal resets the terminal Connection-ID to its initial state, which is preferably the most negative four byte number (Hex 80000000, stored LSB to MSB in Intel format.) For each subsequent transaction request generated at that particular point-of-sale terminal 10, the software register that stores the terminal Connection-ID is incremented by one. In conjunction with the terminal Connection-ID stored at each point-of-sale terminal 10, the gateway 12 maintains a table, the Connection-ID table 22, that keeps a tally of how many transaction requests have been generated by a particular point-of-sale terminal 10, and therefore knows what the next Connection-ID should be for a particular terminal. The values stored in this Connection-ID table 22 are referred to as the gateway Connection-IDs. Using this table, the gateway 12 is able to synchronize itself with the various point-of-sale terminals 10, and thereby avoid the problems with prior wireless transaction processing systems. Once a transaction completes successfully, the next transaction to be used will be the maximum of either (Connection-ID+1) or a constant value that is preferably equal to two.

3) ACK_PROTO_ID (Hex 23):
This protocol ID has the following format:

<Protocol Data>=<Connection ID><Previous Connection ACK Information><Connection ID>=signed long 4-byte integer (Synchronization Value) <Previous Connection ACK Information>=<Length><ACK Packet><Length>=one byte, representing the length of the following ACK packet <ACK Packet>= entire contents of an acknowledge packet to be relayed to Host This protocol ID is sent only by the point-of-sale terminal 10 to the gateway 12, and is used to acknowledge a communication from the host processing system 14. If the host connection associated with the Connection-ID just previous to the one received is still active, then this ACK packet will be sent on by the gateway to the connected host. If the Connection-IDs are no longer synchronized, as described below, then the ACK packet is discarded.

By implementing this connection management protocol, the present invention provides a reliable and efficient method of managing multiple connections between local point-of-sale terminals and host systems via a gateway and a wireless network. The protocol, programmed into the gateway and the point-of-sale terminals, enables the gateway to synchronize itself to the point-of-sale terminals and thereby avoid problems with prior wireless transaction processing systems.

Figure 2:
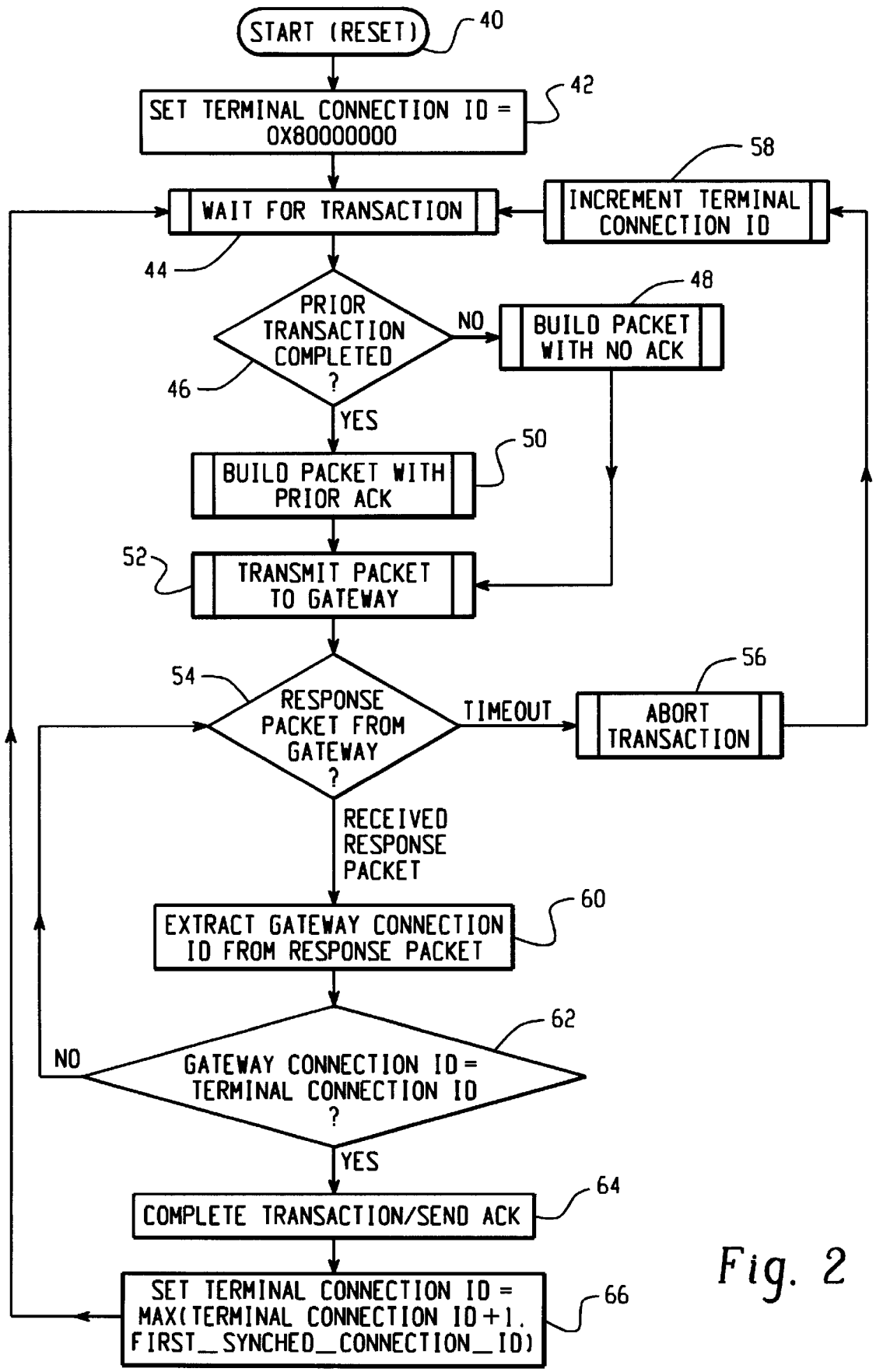
FIG. 2 is a flowchart setting forth the method steps carried out by the connection protocol software operating at the point-of-sale terminal.
Figure 3A:
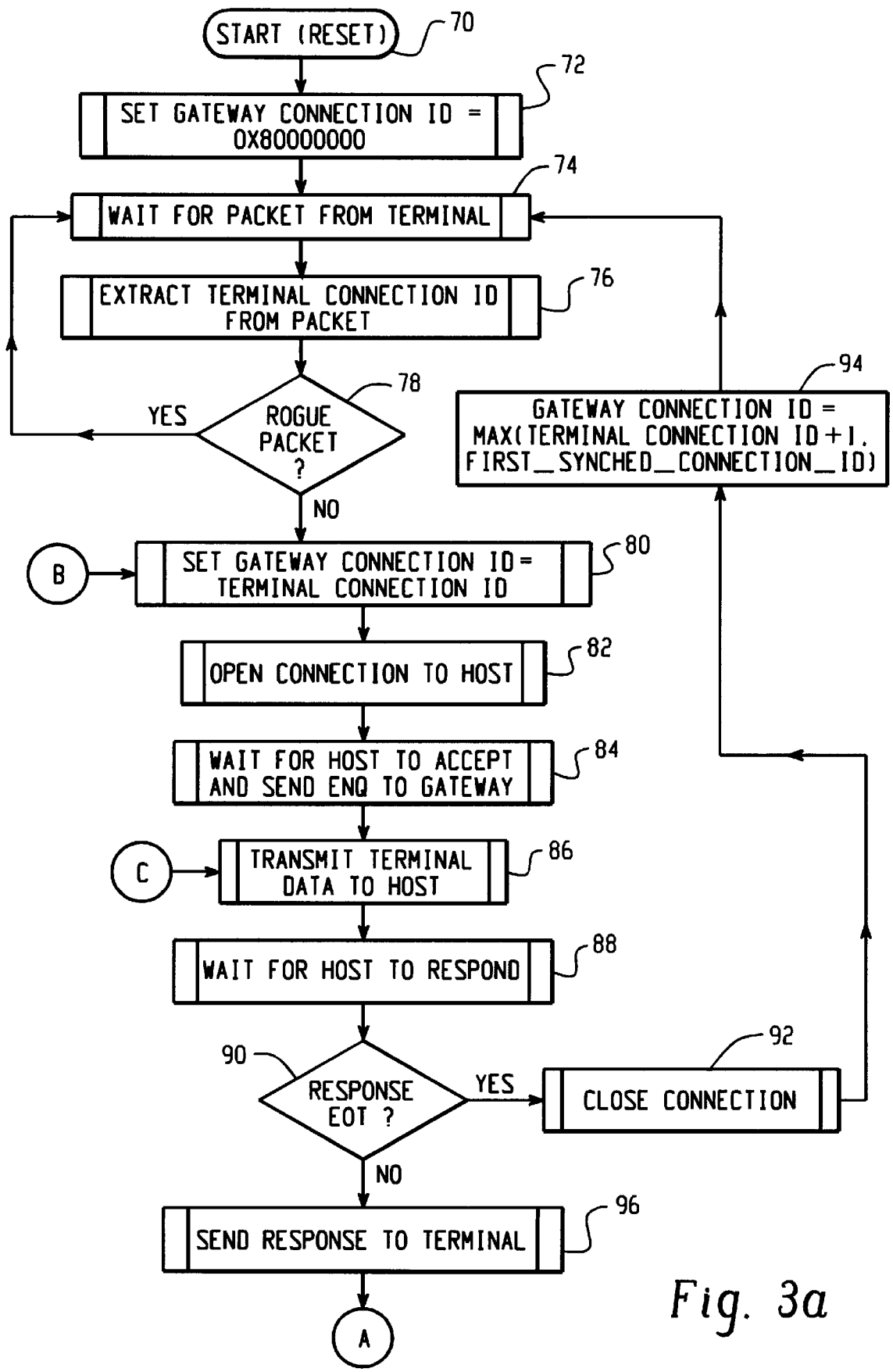
FIGS. 3a and 3b are a flowchart setting forth the method steps carried out by the connection protocol software operating at the gateway computer.
Figure 3B:
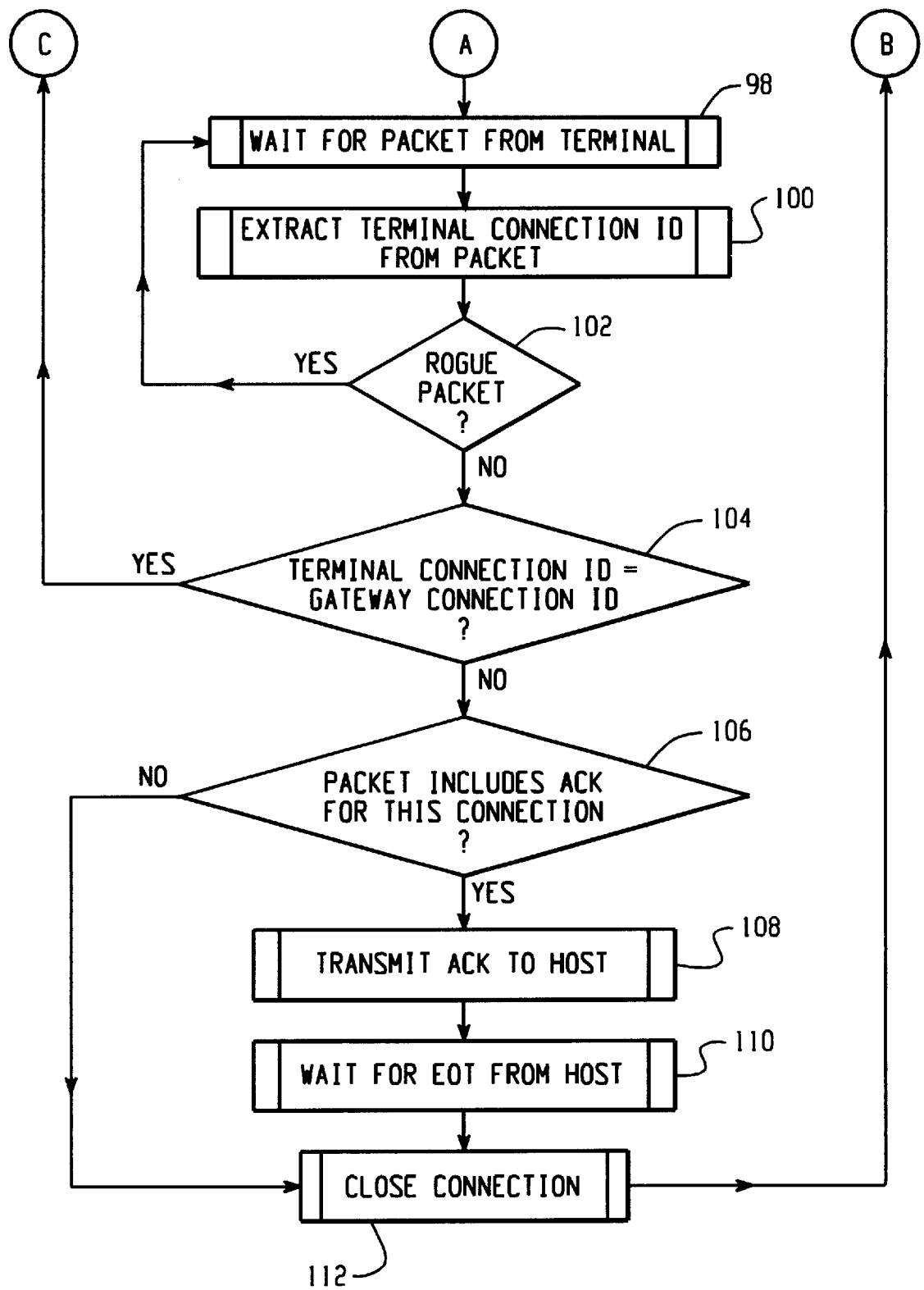

Turning now to FIG. 2, a flowchart is set forth that describes the method steps carried out by the connection protocol software 26 operating at the point-of-sale terminal 10. Beginning at step 40, the terminal 10 is turned on or is reset to its initial state. The terminal Connection-ID is set to its initial value of 0x80000000 at step 42. The terminal then waits 44 for a transaction to occur, such as a credit card purchase. Once a transaction request has been detected at step 44, the software 26 then checks whether the previous transaction was completed or not at step 46. The software 26 performs this check by determining whether a response packet was received by the terminal 10 from the previous transaction. If a response packet was not received, then the software 26 assumes that the prior transaction was not completed normally. If the prior transaction was not completed normally, then control of the terminal is passed to step 48, where the request packet for the current transaction is built without an ACK character. If the prior transaction did complete normally, then control is passed to step 50, where the request packet is built with an ACK character. The purpose of transmitting another ACK character to the gateway 12 when the prior transaction completed normally is to ensure that the prior transaction is properly acknowledged as being completed and that the connection to the host system 14 is closed by the gateway 12. In both steps 48 and 50, the request packet is built and includes the terminal Connection-ID protocol information for this current transaction. At step 52, the terminal request packet, including the embedded connection protocol information, is transmitted to the gateway 12 for processing.

Control of the terminal 10 then passes to step 54, where the terminal 10 waits for a response packet from the gateway 12. If a predetermined period of time has lapsed and a response packet has not been received at the terminal 10, the software 26 assumes that a problem has occurred and a timeout causes control to pass to step 56, where the particular transaction is aborted. In order to keep the terminal 10 synchronized with the gateway 12, which may have received the terminal request packet for this particular transaction, the terminal Connection-ID is incremented by one at step 58 and the terminal 10 returns to step 44 and waits for another transaction.

Assuming that a timeout does not occur at step 54, and a response packet is received from the gateway 12, control passes to step 60, where the gateway Connection-ID for the transaction is extracted from the response packet. At step 62, the connection protocol software 26 determines if the extracted gateway Connection-ID for this response packet matches the current terminal Connection-ID. If the Connection-IDs match, then the two systems are synchronized and control is passed to step 64 where the transaction is completed by sending an ACK packet to the gateway 12, which in turn acknowledges the host system 14, as described more fully in connection with FIG. 3. If the Connection-ID of the response packet (the gateway Connection-ID) extracted in step 60 does not match the current terminal Connection-ID, then the system assumes that this packet is a bad response packet from some prior transaction that did not complete properly. In this case, control is passed from the decision at step 62 back to step 54 so that the terminal 10 can wait for additional response packets from the gateway 12 for this particular transaction.

After the terminal 10 completes the transaction at step 64 by transmitting the ACK command packet to the gateway 12, the terminal Connection-ID is set to the greater of the next terminal Connection-ID (increment the current Connection-ID) or a constant referred to as the First_Synched_Connection_ID. The First_Synched_Connection_ID is preferably equal to two, but could be other constant values. Stated another way, step 66 increments the terminal Connection-ID by one, but sets a minimum value for the terminal Connection-ID of two, which is the value of the constant. The reason for providing this minimum value is to deal with the problem of "rogue" packets, described more fully in connection with FIG. 3. After the terminal Connection-ID has been incremented at step 66, control of the terminal connection protocol software 26 then returns to step 44 and waits for the next transaction.

Turning now to FIG. 3, a flowchart of the gateway connection protocol software 24 is set forth. Beginning at step 70, the gateway 12 is powered up or reset to its initial state. The gateway Connection-IDs for each terminal 10 are then set at step 72 to the initial value of 0x80000000 and these values are stored in the Connection-ID table 22 it the gateway 12. The gateway 12 then waits at step 74 for a terminal request packet from one of the associated point-of-sale terminals 10.

When the gateway 12 receives a terminal request packet control of the connection protocol software 24 passes to step 76, where the terminal Connection-ID embedded in the packets at steps 48 or 50 of FIG. 2 is extracted. At step 78, the gateway 12 determines whether the received terminal request packet is a "rogue" packet. A "rogue" packet is a packet from an "old" or otherwise terminated connection. The determination of whether a received packet is a "rogue" is generally made by comparing the extracted terminal Connection-ID from step 76 to the expected Connection-ID stored in the Connection-ID table 22 for the particular requesting terminal 10. If the extracted terminal Connection-ID is less then the expected value from the Connection-ID table 22, then this generally indicates a "rogue" packet. However, under certain circumstances, such as a power-on reset of the terminal 10, a Connection-ID can be sent that is less than the expected value stored in the Connection-ID table 22, but which is not a rogue. To account for this "reset" problem, step 78 tests whether the extracted Connection-ID is less than the expected Connection-ID AND the extracted terminal Connection-ID is greater than or equal to the constant value First_Synched_Connection_ID. This AND test accounts for the "reset" problem noted above.

If the extracted terminal Connection-ID is less than the expected Connection-ID and it is greater than or equal to the value of the First_Synched_Connection_ID (preferably equal to two), then the packet is a "rogue" and control is passed back to step 74 and the gateway 12 waits for another incoming terminal request packet. If, however, the extracted Connection-ID is equal to or greater than the expected Connection-ID stored in the Connection-ID table 22, or if the value of the extracted Connection-ID is less than the First_Synched_Connection_ID, then the request packet is not a "rogue" and control is passed to step 80.

At step 80, the gateway Connection-ID for the requesting terminal is set equal to the extracted terminal Connection-ID. Along with the extracted connection protocol information, other information is extracted from the incoming packets regarding what host 14 to connect to. The gateway stores a configuration table 20, which is used to lookup the network address of the host system based upon extracted header information from the incoming terminal request packet. At step 82, the connection protocol software 24, using this extracted information regarding the host system, opens a connection to the host 14. The gateway 12 then waits for the host 14 to accept the connection request and to send an ENQ character to the gateway 12, at step 84. Once the host 14 has accepted the connection request, the gateway 12 then transmits the transaction data contained within the terminal data packets to the host system 14, the gateway 12 performing the reformatting of the data packets into whatever data protocol the host is using, such as the X.25 protocol, TCP/IP, etc. Control of the gateway 12 then passes to step 88 where the gateway 12 waits for a response from the host system 14 at step 86.

At step 90, the gateway connection protocol software 24 determines if the response from the host system 14 is an EOT character. Under normal conditions the transmission from the host system 14 to the gateway 12 in response to the terminal request data should not be the EOT character, but instead the normal transaction response data authorizing or not authorizing the transaction. Assuming that the response from the host system 14 is not the EOT character, control then passes to step 96, where the received host system data is transmitted to the terminal 10. Although not shown explicitly, step 96 also includes the steps of converting the data from the host protocol to the wireless protocol and inserting the special connection protocol information into each packet. The inserted Connection-ID is the gateway Connection-ID associated with the particular terminal requesting the transaction.

After transmitting the host response data to the terminal 10, the gateway 12 then waits for a packet from the terminal 10 at step 98. Once a packet is received, the gateway 12 then extracts the terminal Connection-ID at step 100 (similar to step 76) and checks to see if the packet is a "rogue", at step 102 (similar to step 78). If the packet is a "rogue" it is ignored and control passes back to step 98, where the gateway 12 waits for the next packet. If the packet is not a "rogue", then at step 104, the gateway 12 determines whether the extracted terminal Connection-ID matches the current gateway Connection-ID stored in the Connection-ID table 22. If the Connection-IDs match, then this packet is part of the same transaction as the last packet and control is transferred back to step 86 where the data from this latest packet is then transmitted to the host system 14. The steps 86–88–90–96–98–100–102–104 are repeated as long as an EOT is not received from the host system 14, and as long as the terminal packets include terminal Connection-ID information that matches the gateway Connection-ID.

At some point the host system 14 will transmit an EOT character to the gateway 12, typically in response to receiving the ACK character from the terminal 10. This indicates to the gateway 12 that the transaction has been completed at the host end. In response to receiving the EOT character, the gateway 12 at step 90 transfers control to step 92, and the connection between the gateway 12 and the host system 14 is closed. A step 94 the gateway Connection-ID is then set to the greater of the next expected terminal Connection-ID or the First_Synched_Connection_ID constant. The purpose of setting the gateway Connection-ID to First Synched_Connection_ID is the same as in step 66 of FIG. 2—to deal with the "reset" problem when determining whether an incoming packet is a "rogue."

If the extracted terminal Connection ID is not the same as the gateway Connection-ID at step 104, then a problem has occurred in the transmission between the terminal 10 and the gateway 12. In this situation another transaction request has been received by the gateway 12 from the particular requesting terminal 10, but the prior transaction with the terminal has not been properly closed. Steps 106–112 deal with this problem.

At step 106, the gateway connection protocol software 24 determines whether the packet includes an ACK character for the existing transaction. If it does, then at step 108 the ACK is transmitted to the host system 14. As previously described, the identity of the host system 14 is determined by extracting header information from the terminal data packets and looking up the address of the host 14 using the stored configuration table 20. The gateway 12 then waits for the EOT character from the host 14 at step 110. After receiving the EOT character, the gateway 12 closes the prior connection to the host 14 at step 112, and control returns to step 80, where the gateway Connection-ID is set equal to the terminal Connection-ID of the present transaction request, and at step 82, a connection is established. If, at step 106, the software 24 determined that the packet did not contain an ACK character for the existing connection, then control passes to step 112 and the connection is simply closed.

Having described in detail the preferred embodiment of the present invention, including its preferred modes of operation, it is to be understood that this operation could be carried out with different elements and steps. This preferred embodiment is presented only by way of example and is not meant to limit the scope of the present invention which is defined by the following claims.

What is claimed:

1. A method of managing connections between a plurality of point-of-sale terminals and a host system via a packet-switched network, the method comprising the steps of:

providing a gateway computer that forms a bridge between the point-of-sale terminals and the host system;

embedding connection identification information into a terminal request packet generated by the point-of-sale terminals when a connection is to be established to the host system, the connection identification information including a terminal connection identification variable;

transmitting the terminal request packet to the gateway;

verifying that the gateway and the point-of-sale terminal transmitting the terminal request packet are synchronized by comparing the terminal connection identification variable to a gateway connection identification variable stored at the gateway, wherein the gateway connection identification variable is associated with the particular point-of-sale terminal transmitting the terminal request packet; and if the gateway and point-of-sale terminal are synchronized, then creating a connection between the gateway and the host system.

2. The method of claim 1, wherein the embedding step includes the steps of:

setting the terminal connection identification variable to a predetermined starting value when the point-of-sale terminal is reset or power is applied to the terminal;

waiting for a transaction to occur at the point-of-sale terminal; and building a terminal request packet at the point-of-sale terminal that includes the terminal connection identification variable.

3. The method of claim 2, wherein the embedding step includes the additional step of:

prior to building the request packet, determining whether a prior transaction completed normally, and if so, building the request packet with an ACK character.

4. The method of claim 2, wherein the verifying step includes the steps of:

storing a plurality of gateway connection identification variables at the gateway that correspond to each point-of-sale terminal;

setting the gateway connection identification variables to a predetermined starting value when the gateway is reset or power is applied to the terminal;

waiting for a terminal request packet from a point-of-sale terminal;

extracting the terminal connection identification variable from the terminal request packet; and comparing the extracted terminal connection identification variable to the gateway connection identification variable that corresponds to the particular point-of-sale terminal to determine whether the gateway and the point-of-sale terminal are synchronized.

5. The method of claim 4, wherein the creating a connection step includes the steps of:

setting the gateway connection identification variable equal to the terminal connection identification variable;

extracting host addressing information from the terminal request packet;

looking up the actual host address using the extracted host addressing information; and opening a connection between the gateway and the host using the actual host address.

6. The method of claim 5, further comprising the step of:

transmitting information from the terminal request packet to the host system.

7. The method of claim 6, further comprising the steps of:

receiving the information from the terminal request packet at the host system; and transmitting a host response to the gateway in response to the information from the terminal request packet.

8. The method of claim 7, further comprising the steps of:

receiving the host response at the gateway; and building a host response packet at the gateway that includes the host response and the gateway connection identification variable corresponding to the particular point-of-sale terminal.

9. The method of claim 8, further comprising the steps of:

transmitting the host response packet from the gateway to the point-of-sale terminal;

receiving the host response packet at the point-of-sale terminal;

extracting the gateway connection identification variable from the host response packet; and comparing the extracted gateway connection identification variable to the terminal connection identification variable associated with the point-of-sale terminal.

10. The method of claim 9, further comprising the steps of:

if the extracted gateway connection identification variable is equal to the terminal connection identification variable then:

building an acknowledge packet at the point-of-sale terminal including an ACK character and the terminal connection identification variable; and transmitting the acknowledge packet from the point-of-sale terminal to the gateway.

11. The method of claim 10, further comprising the steps of:

verifying that the gateway and the point-of-sale terminal transmitting the acknowledge packet are still synchronized; and if the gateway and the point-of-sale terminal are synchronized, then transmitting the acknowledge packet to the host system.

12. The method of claim 10, further comprising the steps of:

incrementing the terminal connection identification variable; and waiting for the next transaction to occur at the point-of-sale terminal.

13. The method of claim 2, further comprising the steps of:

the point-of-sale terminal waiting for a response packet from the gateway;

if a predetermined period of time has lapsed and no response packet has been received by the point-of-sale terminal, then:

aborting the current transaction;

incrementing the terminal connection identification variable; and waiting for the next transaction to occur at the point-of-sale terminal.

14. The method of claim 7, further comprising the steps of:

receiving the host response at the gateway;

determining whether the host response contains an end-of-transmission (EOT) character;

if the host response contains the EOT character, then:

closing the connection to the host system;

incrementing the gateway connection identification variable; and waiting for the next terminal request packet.

15. The method of claim 1, wherein the packet-switched network is a wireless network.

16. A system for managing connections between one or more local terminals and a remote host system, comprising:

a gateway computer system connected between the local terminals and the remote host system;

connection protocol software stored at the local terminals for embedding a terminal connection identification variable into request packets generated by the local terminals when the terminal is requesting a connection to a remote host system, wherein the local terminals alter the terminal connection identification variable for each connection request;

connection protocol software stored at the gateway computer for extracting the embedded terminal connection identification variable and determining if the gateway and the requesting local terminal are synchronized by comparing the value of the terminal connection identification variable to a stored gateway connection identification variable for the particular local terminal making the connection request.

17. The system of claim 16, wherein the gateway includes a connection identification variable look-up table that stores the gateway connection identification variables for each local terminal.

18. The system of claim 16, wherein the gateway includes a configuration table that stores the network addresses of the one or more host systems connected to the gateway.

19. The system of claim 17, wherein the connection protocol software stored at the local terminals comprises:

means for setting the terminal connection identification variable to a predetermined value when the local terminal is reset or power is applied to the terminal;

means for receiving transaction data at the local terminal; and means for building a terminal request packet at the local terminal that includes the terminal connection identification variable and the transaction data.

20. The system of claim 19, wherein the connection protocol software stored at the local terminals further comprises:

means for determining whether a prior transaction completed normally, and if so, for building the request packet with an ACK character.

21. The system of claim 17, wherein the connection protocol software stored at the gateway comprises:

means for setting the gateway connection identification variables to a predetermined value when the gateway is reset or power is applied to the gateway;

means for receiving a terminal request packet from a local terminal;

means for extracting the terminal connection identification variable from the received terminal request packet; and means for determining whether the gateway and the local terminal are synchronized.

22. The system of claim 21, further comprising:

means for creating a connection between the local terminal and a remote host system if the gateway and the local terminal are synchronized.

23. The system of claim 22, wherein the means for creating a connection comprises:

means for setting the gateway connection identification variable to the extracted terminal connection identification variable;

means for extracting host addressing information from the terminal request packet; and means for opening a connection between the gateway and the host system using the extracted addressing information.

* * * * *